METHOD OF TREATING MAGNETIC RECORDING ELEMENTS
Filed April 25, 1967
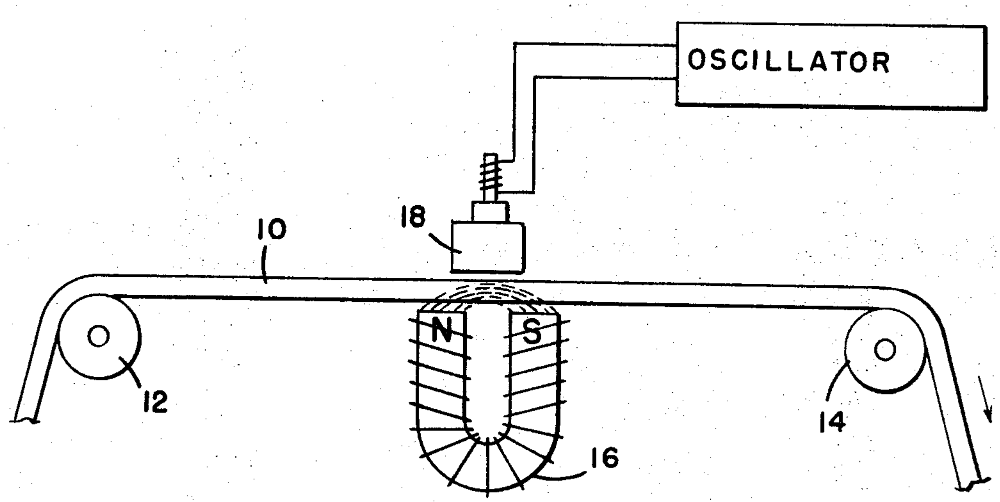

United States Patent Office 3,533,836

Patented Oct. 13, 1970

3,533,836

METHOD OF TREATING MAGNETIC RECORDING ELEMENTS

John T. Massengale and Theodore H. Fairbanks, West Chester, Pa., assignors to FMC Corporation, Philadelphia, Pa., a corporation of Delaware Filed Apr. 25, 1967, Ser. No. 633,479

Int. Cl. H01f *10/00;* B44d *1/44*

U.S. Cl. 117—237 2 Claims

ABSTRACT OF THE DISCLOSURE

A method of treating the magnetic coating of a magnetic recording tape to bring about a uniform magnetic alignment of the magnetic particles in the coating. The alignment of the particles is accomplished by magnetic means and the coating is subjected to supersonic vibrations at the same time to facilitate the movement of the magnetic particles into alignment.

This invention relates to the production of magnetic recording tapes and the like and more particularly to an improved method of uniformly aligning the magnetic axes of the magnetic particles in the coating. While the invention will be described with particular reference to an elongated flexible tape, it is to be understood that it is equally applicable to other types of magnetic recording elements such as discs, tubes and other specific recording media.

Magnetic recording tapes generally comprise a flexible support of non-magnetic material such for example as cellulose acetate which is coated with magnetic particles suspended in a non-magnetic flexible resinous binder. The binder or carrier may be a non-thermoplastic film forming cellulose ester or ether but more usually is a thermoplastic such as a vinyl, acrylic, polyester or polycarbonate resin or the like. The magnetic particles are of submicron size and are commonly gamma iron oxide, magnatite or ferrites. The particles may be acicular or non-acicular but in any event are magnetically anisotropic in character. That is to say, the particles exhibit maximum susceptibility or sensitivity to an external magnetic field along a specific axis sometimes referred to as the axis of easy magnetization and referred to herein simply as the magnetic axis. The coating is applied in a viscous condition, usually from a melt, and as applied the magnetic axes of the magnetic particles are randomly oriented. It is well recognized that the signal to noise ratio and the frequency response of the tape are immeasurably improved when the magnetic axes of the magnetic particles are uniformly oriented in a direction extending parallel to the lines of force in the recording head of the instrument with which the tape is to be used.

According to the prior art, one method of obtaining the desired orientation of the magnetic axes of the particles is by subjecting the coating while the binder component thereof is in a viscous condition to the action of a magnetic field the lines of force of which extend in the direction of desired orientation of the magnetic axes of the particles. With the binder in a viscous condition the magnetic particles are able to move so that their magnetic axes become aligned with the lines of force of the impressed magnetic field. However, it is usually desirable to solidify the binder while the magnetic particles are still under the influence of the external field for otherwise the individual particles, having their own north and south poles, begin to influence one another immediately after being relieved of the influence of the external field and this can result in movement of at least some of the particles to positions wherein their magnetic axis is no longer aligned or oriented in the desired direction. When the directional orientation of the magnetic axes of the particles is to be achieved solely by means of a unidirectional magnetic field, a very delicate balance between the viscosity of the coating and the strength of the field must prevail. Thus the coating must be viscous enough to permit the particles to move to the limited extent necessary to achieve the desired orientation and at the same time the magnetic field must not be so strong as to actually dislodge the particles completely from the coating. Thus while it is theoretically possible to achieve uniform orientation of the magnetic axes of the particles solely by subjecting them to a uniform magnetic field while the binder component of the coating is in a viscous state, it is hardly practicable in practice.

In order to improve the uniformity of orientation of the magnetic axes of the magnetic particles and to provide a smoother, more uniform coating on the tape, it is proposed in U.S. Pat. No. 3,001,891 to subject the coating to the action of an alternating magnetic field prior to or simultaneously with the application of the direct or unidirectional magnetic field. In U.S. Pat. No. 3,117,065 it is proposed to subject the magnetic particles to a magnetic field which is modulated in intensity and/or direction in addition to the usual unidirectional field. In both of these patents the basic idea seems to be to bring about a jiggling of the magnetic particles so as to enable them to move more freely in the viscous binder under the influence of the unidirectional orienting field.

It is an object of the present invention to provide an improved method for treating a magnetic recording element in order to bring about a uniform alignment of the magnetic particles thereof.

A further object of the invention is to provide a method of uniformly aligning the magnetic axes of the magnetic particles in the resinous binder of the coating of a magnetic recording element without the necessity of having the binder in a viscous state.

Other and further objects, features and advantages of the invention will appear as the description of a preferred form thereof proceeds.

Referring now to the drawing:

The single figure is a diagrammatic representation of a form of apparatus suitable for carrying out the method.

According to the present invention, the resin coating containing the magnetic particles is applied to the flexible support in a conventional manner as for example by extrusion from a melt. The coating is then solidified by reducing the temperature and the coated tape indicated in the drawing at 10 is fed around a pair of rollers or the like 12 and 14 between which it is treated to bring about a uniform alignment or orientation of the magnetic axes of the magnetic particles in the coating. One of the advantages of the present invention is that the treatment is carried out while the resinous binder portion of the coating is in a solid or non-viscous state, thus eliminating the necessity and complication of rapidly solidifying the coating after the desired orientation is achieved.

Since the coating is in a solid condition, it can be either on the upper face or lower face of the tape as it passes between rollers 12 and 14. Located closely beneath the tape is an electromagnet 16 having a north and a south pole as indicated. The current supply of the magnet is direct and of constant value whereby to produce a magnetic field having lines of force the midportions or extensions of which run generally parallel to the longitudinal axis of the tape whereby to influence the magnetic particles of the coating to align their magnetic axes longitudinally of the tape. However, this longitudinal alignment of the magnetic axes can only be brought about when the magnetic particles are capable of movement within the resinous binder. In order to enable the magnetic particles to move, the head 18 of a supersonic transducer activated by an oscillator is positioned above the electromagnet. Preferably the head 18 of the transducer extends lengthwise of the tape to a lesser extent than the field of magnet 16 whereby the effect of the supersonic vibrations emanating from the transducer is confined to that portion of the tape, or rather the coating of the tape, that has the lines of force of the electromagnet extending longitudinally of the tape. If it is desired to orient the magnetic particles so that the magnetic axes thereof extend at an angle to the longitudinal axis of the tape then the transducer head and the electromagnetic are so arranged that the vibrations emanating from the transducer intercept the lines of force of the magnetic field at the place where those lines are extending in the direction in which it is desired to orient the magnetic axes of the magnetic particles.

The supersonic vibrations cause a jiggling movement of all parts of the coating including the resinous binder, whereby a magnetic field of relatively low strength is able to shift the magnetic particles so that their magnetic axes become aligned with the field of the electromagnet. Since the coating is in a solid state at the time of the treatment, the magnetic particles are no longer capable of movement after the tape moves out of the influence of the supersonic vibrations and thus the desired alignment is maintained without the need of rapidly solidifying the coating as is necessary with prior art procedures.

As previously indicated, the binder component of the coating will normally or usually be a thermoplastic resin such as a vinyl, acrylic, polyester, polycarbonate or the like. In such case it is necessary to have the coating at a somewhat elevated temperature at the time the tape is passed between electromagnet 16 and transducer head 18. For best results the coating should be between the glass or second order transition temperature and the melt temperature of the particular resin involved. Below the second order transition temperature of the resin the molecular bonds are so strong that excessive vibrations would be required to free the magnetic particles. Above the melt temperature of the resin it becomes necessary to provide temperature controls so as to solidify the resin after the magnetic axes of the magnetic particles have been aligned and while still under the influence of the external magnetic field. However, at any temperature above the second order transition temperature, the internal molecular bonds of the resin are weakened and it becomes relatively easy for the resin molecules to vibrate or jiggle when the tape is passed through the vibrating field of the transducer. Of course the magnetic particles are also set in motion by the supersonic vibrations and with both the resin molecules and the submicron magnetic particles in motion, only a relatively weak external magnetic field is necessary to swing the magnetic particles into the desired direction of orientation.

Having thus described the invention, what is claimed is:

1. The method of treating a magnetic recording element comprising a surface layer of magnetically anisotropic particles in a solid thermoplastic resin binder to uniformly align the magnetic axes of said magnetically anisotropic particles; said method comprising subjecting said surface layer while it is at a temperature between the glass transition temperature and the melt temperature of said thermoplastic resin to the simultaneous actions of non-magnetic ultrasonic vibrations and a unidirectional magnetic field.

2. The method set forth in claim 1 wherein the temperature of the surface layer is only slightly above the glass transition temperature of the resinous binder whereby no reduction in temperature is necessary to fix the particles in their aligned positions.

References Cited

UNITED STATES PATENTS

| | | | |
|---|---|---|---|
| 3,001,891 | 9/1961 | Stoller | 117—235 X |
| 3,026,215 | 3/1962 | Fukuda et al. | 117—238 |
| 3,117,065 | 1/1964 | Wooten | 117—235 X |
| 3,261,706 | 7/1966 | Nesh | 117—238 X |

WILLIAM D. MARTIN, Primary Examiner

B. D. PIANALTO, Assistant Examiner

U.S. Cl. X.R.

117—235, 238

UNITED STATES PATENT OFFICE

CERTIFICATE OF CORRECTION

Patent No. 3,533,836 Dated October 13, 1970

Inventor(s) John T. Massengale and Theodore H. Fairbanks

It is certified that error appears in the above-identified patent and that said Letters Patent are hereby corrected as shown below:

Col. 1, line 41 "acicular" should be --acircular--
Col. 1, line 42 "non-acicular" should be --non-acircular--

SIGNED AND SEALED DEC 15 1970

(SEAL)
Attest:

Edward M. Fletcher, Jr.
Attesting Officer

WILLIAM E. SCHUYLER, JR.
Commissioner of Patents